United States Patent [19]

Kawahara et al.

[11] Patent Number: 5,483,466

[45] Date of Patent: Jan. 9, 1996

[54] CLIENT/SERVER SYSTEM AND MAIL RECEPTION/DISPLAY CONTROL METHOD

[75] Inventors: Tetsuya Kawahara, Fujisawa; Junji Nakata; Yuji Kimura, both of Yokohama; Hiroyuki Sakai; Masakazu Hamaguchi, both of Ebina; Takahiro Yamada; Tomohisa Kohiyama, both of Yokohama; Takahiro Nakano, Urawa, all of Japan

[73] Assignee: Hitachi, Ltd., Tokyo, Japan

[21] Appl. No.: 151,813

[22] Filed: Nov. 15, 1993

[30] Foreign Application Priority Data

Nov. 13, 1992 [JP] Japan ..................... 4-304078

[51] Int. Cl.$^6$ ................................. G06F 13/00
[52] U.S. Cl. ..................... 364/514 C; 364/247.7; 364/919; 364/919.5; 364/DIG. 1; 364/DIG. 2; 395/200.09
[58] Field of Search ................. 364/247.7, 514, 364/919, 919.5; 395/200

[56] References Cited

U.S. PATENT DOCUMENTS

| | | | |
|---|---|---|---|
| Re. 26,832 | 3/1970 | Randlev | 395/200 |
| 3,456,242 | 7/1969 | Lubkin et al. | 395/200 |
| 4,479,195 | 10/1984 | Herr et al. | 395/200 |
| 4,800,488 | 1/1989 | Agrawal et al. | 395/800 |
| 5,131,077 | 7/1992 | Indei | 395/113 |
| 5,191,652 | 3/1993 | Dias et al. | 395/200 |
| 5,349,579 | 9/1994 | Madonna et al. | 370/58.2 |

OTHER PUBLICATIONS

*Nikkei computer*, "Widened Choice of Electronic Mail Software", by Nikkei BP, Inc., issued on May 4, 1992.

*Primary Examiner*—Edward R. Cosimano
*Attorney, Agent, or Firm*—Antonelli, Terry, Stout & Kraus

[57] ABSTRACT

A mail reception/display control method which permits a user on a reception side to be informed the reception of an item of mail immediately upon reception of the mail even during the course of another job, and to ascertain the content of the received mail with ease upon mail reception. A mail reception detection unit included in each of the client terminals monitors the mail reception from any other client. When the mail reception has been detected, a mail attribute discrimination unit decides whether or not the received mail is to be transferred from a server to that particular client. When the mail transfer is required, a mail transfer unit transfers the mail from the server to the particular client. Subsequently, a mail reception display unit disposed at the client on the reception side presents a display to the effect that the mail has been received. Further, when the user has made a reply of confirmation to the display of the mail reception, a mail replay unit replays the received mail.

6 Claims, 5 Drawing Sheets

FIG. 3

| AREA NO. | SITUATION OF REGISTRATION/ REPLAY | MAIL NAME | MAIL ATTRIBUTE |
|---|---|---|---|
| 1 | NEW | ○○○×× | URGENT (TRANSFER REQUIRED) |
| 2 | NOT REPLAYED | ×○○×△ | ORDINARY |
| 3 | UNDER REGISTRATION | △△○○×× | ORDINARY (TRANSFER REQUIRED) |
| 4 | REPLAYED | | |
| ⋮ | ⋮ | ⋮ | ⋮ |
| i | | | |
| ⋮ | ⋮ | ⋮ | ⋮ |
| n | | | |

CLIENT/SERVER SYSTEM AND MAIL RECEPTION/DISPLAY CONTROL METHOD

BACKGROUND OF THE INVENTION

1. Field of the Invention

The present invention relates to a client/server system wherein a server equipped with a storage unit for storing items of mail therein is connected with a plurality of clients through a communication line. More particularly, it relates to a mail system wherein items of mail are transmitted and received among a plurality of clients.

2. Description of the Related Art

Heretofore, the transmission and reception of items of mail through the storage unit of a server among clients in a mail system have proceeded as stated below. The area size of the storage unit of the server is divided into areas for the individual clients beforehand. The client on a mail transmission (source or addresser) side writes the item of mail into his/her own area within the storage unit of the server. Subsequently, the mail software of the server transfers the mail to that area of the storage unit of the server which corresponds to the destination of the mail. For the client on the reception (destination or addressee) side, the reception of the mail is detected by the function of a network operating system, a module for monitoring the reception of mail as has been made resident in advance, or the like, and a display is presented on display means to the effect that the mail has been received. Thus, the user on the reception side can determine the arrival of the mail addressed to him/her. Herein, the user starts mail software at his/her convenience, or when he/she is performing any job by the use of another application in the state in which the mail software has already been started, he/she changes-over the applications. Thereafter, he/she loads the corresponding mail stored in the storage unit of the server by the use of the mail software so as to ascertain the content thereof.

The above prior-art technique is stated in, for example, feature articles "Widened Choice of Electronic Mail Software" in NIKKEI COMPUTER dated May 4, 1992, issued by Nikkei BP Inc.

With the prior-art technique, for each client who has received an item of mail addressed to him/her, the fact of the reception can be displayed on the display unit or the like by, e.g., the function of the network operating system or the module for monitoring the mail reception as has been made resident in advance. Therefore, the user can be informed of the mail reception even during the course of a different job.

In order to ascertain the content of the received mail, however, the user needs to expressly start the mail software or change-over the applications even when the mail software has already been started. This poses the problem that the handling of the mail system is inconvenient to the user.

The attributes of the received mail, such as urgency and importance, are discriminated by the function of the mail software. The display of the mail reception merely reports the reception itself, and it disappears when the user has made a reply of confirmation thereto. Therefore, although the user can know of the reception of the mail at the time of the reception, he/she can find out the attribute of the mail only when he/she has started the mail software. Moreover, even when the mail software has already been started, the user can find out the attribute of the mail only after the change-over to the use of the mail software when the plurality of sorts of application software have been started and where the application software other than the mail software is being used.

In other words, even when the received mail is urgent, the user on the reception side cannot know the urgency except by ascertaining it through the mail software. This poses the problem that the user might fail to promptly reply to urgent mail, or that, in an extreme case, he/she might even forget having received the mail because of his/her immersion in the other job.

Further, on the side on which the mail has been received, the user ascertains the content of the mail by loading the corresponding mail from within the storage unit of the server. Therefore, when there is much communication line traffic in the case of replaying and displaying an item of animation mail or the like, the prior art involves the problem that a long time is expended on the data transfer, so the normal replaying display is impossible.

SUMMARY OF THE INVENTION

An object of the present invention is to provide a mail reception/display control method and a client/server system in which, when a reception side client has received mail information, the user can readily ascertain the content of received mail.

Another object of the present invention is to precisely replay an item of mail which is otherwise affected by the traffic state of a communication line in the replaying display thereof, irrespective of the traffic state of the communication line.

In order to solve the problems stated before, a client/server system according to the present invention comprises a server which includes storage means for storing information therein; a plurality of clients each of which includes transfer means for registering the information in the storage means of the server and for loading the information from the storage means, and each of the plurality of clients includes reception detection means for monitoring if the information addressed to the each client has been received by the server; display means for producing a display output indicative of the reception of the information addressed to the each client when the reception of the information addressed to each client has been detected by the reception detection means, and for displaying as another output the information addressed to the each client, based on the condition that a user at each client has instructed the display means to display the information addressed to the respective client; input means for accepting, at least, a confirmation reply of the reception of the user's instruction when the reception of the information addressed to the each client has been displayed by the display means; and replay control means for directing the display means to display the information addressed to the each client, when the confirmation reply of the reception of the user's instruction has been accepted by the input means.

It is possible that: the server includes a management table which manages the information stored in the storage means; that each of the plurality of clients further includes record means for writing situation information and identification information into the management table, wherein the situation information indicates a selected one of an expression "New" which signifies that the information is to be registered in the storage means anew, and an expression "Replayed" which signifies that the information registered anew has been loaded from the storage means by the transfer means, while the identification information identifies the addressee client of the information to-be-transmitted, and it is written when the information is to be registered in the storage means by the transfer means; that the reception detection means refers to the management table in order to monitor if the information addressed to the each client has been received by the server, and it detects the reception of the information addressed to each client when the expression "New" is borne as the situation information; that the transfer means loads the information addressed to each client and bearing the expression "New" as the situation information, from the storage means; and that the record means rewrites the situation information of the loaded information to the expression "Replayed" after the information has been loaded by the transfer means.

Alternatively, it is possible that: the server includes a management table which manages the information stored in the storage means; that each of the plurality of clients further includes record means for writing situation information and identification information into the management table, wherein the situation information indicates a selected one of an expression "New" which signifies that the information is to be registered in the storage means anew, an expression "Replayed" which signifies that the information registered anew has been loaded from the storage means by the transfer means, and an expression "Not replayed" which signifies that the reception of the new registered information by the server has been detected by the reception detection means, and that the new registered information has not yet been loaded from the storage means by the transfer means, while the identification information identifies the addressee client of the information to-be-transmitted, and it is written when the information is to be registered in the storage means by the transfer means; that the reception detection means refers to the management table in order to monitor if the information addressed to each client has been received by the server, and it detects the reception of the information addressed to each client when the expression "New" is borne as the situation information; that the record means rewrites the situation information of the received information to the expression "Not replayed" when the reception has been detected by the reception detection means; that the transfer means loads the received information bearing the expression "Not replayed" as the situation information, from the storage means; and that the record means rewrites the situation information of the loaded information to the expression "Replayed" after the information has been loaded by the transfer means.

It is also allowed that: the management table further manages any attribute which concerns the information stored in the storage means; that the record means further writes the attribute when the information is to be transmitted to the server by the transfer means; that the reception detection means further detects the attribute written in the management table; and that the display means displays the attribute as still another output, along with the display output which indicates the reception of the information addressed to each client.

It is also allowed that: the attribute specifies for the loading of the stored information by the transfer means, either of the timing at which the reply of confirmation of the reception as the user's instruction has been accepted by the input means, and an alternative timing before accepting the user's instruction, at which the reception of the information addressed to each client has been detected by the reception detection means; and that the reception detection means directs the transfer means to load the stored information at the timing specified by the attribute, when it has detected the attribute written in the management table.

Alternatively, it is possible that: the attribute specifies either of an operation of presenting the display of the information addressed to each client, when the reply of confirmation of the reception as the user's instruction has been accepted by the input means, and an operation of presenting the display when the information has been loaded by the transfer means, alternatively without accepting the user's instruction; and that the reception detection means directs the transfer means to load the information addressed to each client as stored in the storage means and also directs the display means to display the information addressed to each client, if the attribute written in the management table as detected by the reception detection means specifies the operation of presenting the display when the information has been loaded by the transfer means.

On the other hand, according to the present invention, an information reception/display control method in a mail system having a plurality of terminals which transmit and receive information, and storage means for storing therein the information sent from each of the terminals comprises the steps of: monitoring if the information addressed to each terminal has been stored in the storage means; producing a display output which indicates, at least, that the information addressed to each terminal has been received by the storage means, when the storage of the information in the storage means has been detected; accepting, at least, a reply of confirmation of the reception from a user at each terminal when the display output has been produced; loading the information addressed to each terminal, from the storage means when the reply of confirmation of the reception has been accepted; and displaying the loaded information addressed to each terminal, as an output. In this case, it is allowed that: when the information is to be transmitted from each terminal to the storage means, an attribute which specifies an operation of loading the information at the detection of the reception of the information is affixed to the information; and that, if the attribute is affixed when the storage of the information addressed to each terminal, in the storage means has been detected, the information addressed to each terminal is loaded from the storage means at the detection, instead of at the acceptance of the reply of confirmation of the reception.

Another information reception/display control method may well comprise the steps of: allowing each terminal to transmit the information to the storage means, and to affix an attribute to the information, wherein the attribute specifies either of an operation of displaying the information when the information has been loaded from the storage means, and an operation of displaying the information when a confirmation reply of the reception of the information has been accepted from a user at each terminal; monitoring if the information addressed to each terminal has been stored in the storage means; discriminating the attribute, and loading the information addressed to each terminal, from the storage means, when the storage of the information in the storage means has been detected; producing a display output which indicates the reception of the information addressed to each terminal, when the reception of the information has been detected; displaying the information addressed to each terminal, as an output at the loading of the information from the storage means, on condition that the discriminated attribute specifies the operation of displaying the information when the information has been loaded from the storage means; and displaying the information addressed to each terminal, as an output at the acceptance of the reply of confirmation of the reception from the user, on condition that the discriminated attribute specifies the operation of displaying the information when the reply of confirmation of the reception has been accepted from the user.

In the client/server system, the plurality of clients and the server are interconnected through the communication line of, e.g., Ethernet. On the transmission source (addresser) client side, when an item of mail (information) is to be transmitted to any other client, the mail to-be-transmitted is registered in the storage means of the server, and the name of the mail to-be-transmitted (the file name of the mail) and the attribute of the mail (such as "urgent" "important" or "strictly confidential") is written into the management table for the transmission destination (addressee) clients as recorded in the storage means of the serves. On the client side, the expression "New" which signifies that the information is to be registered in the storage means anew is registered as the situation information.

For each of the clients, the user's the management table of (for each client) as recorded in the storage means of the server is cyclically monitored to check if the mail addressed to the each client bears the situation information "New". In the case where the expression "New" is registered in the management table, each client detects the reception of the mail addressed thereto and reads the attribute of the received mail out of the management table. Herein, in the case where the attribute of the mail specifies that the mail shall not be displayed simultaneously with the transfer thereof, the mail is transferred from the storage means of the server to that of each client. When the mail transfer has been completed, or when the reception of the mail not requiring the mail transfer has been detected, the display to the effect that the mail has been received is presented on the display means, along with the mail attribute registered in the management table. When the mail is not transferred, the situation information is altered to the expression "Not replayed" which signifies that the reception of the new registered information by the server has been detected by the reception detection means, and that the new registered information has not yet been loaded from the storage means of the server by the transfer means. On the other hand, when the mail has been transferred and where the user at each client having received the mail gives the confirmation reply (as the user's instruction) to the display of the mail reception, each client directs the display means to display the content of the received mail, at the acceptance of the user's instruction by the input means. In accordance with the user's instruction, the display means displays the mail transferred to the storage means of each client. After such a replay, the situation information is altered to the expression "Replayed" which signifies that the information registered anew has already been replayed. Meanwhile, when the attribute of the mail specifies that the mail shall be displayed at the loading thereof by the transfer means, each client can direct the transfer means to load the mail addressed thereto as stored in the storage means of the server and can also direct the display means to display the mail addressed thereto, without accepting the confirmation reply of the reception as the user's instruction.

In this manner, at each client, when the mail addressed thereto has been received, the user can know of the attribute of the mail along with the reception thereof. Moreover, the user can ascertain the content of the received mail without expressly starting the mail software or changing-over the application to the mail software. Furthermore, when required in accordance with the attribute of the mail, it is possible to transfer the mail from the storage means of the server to that of each client and to load the mail from the storage means of the each client, thereby normally displaying the mail without being affected by the traffic state of the communication line.

BRIEF DESCRIPTION OF THE DRAWINGS

FIG. 3 is a diagram showing the format of a management table which is included in the software depicted in FIG. 1;

FIG. 8 is a flow chart of a mail reception process and a mail replay process which are executed in each client unit depicted in FIG. 2.

DETAILED DESCRIPTION OF THE INVENTION

Now, an embodiment of the present invention will be described in conjunction with the drawings.

Figure 1:
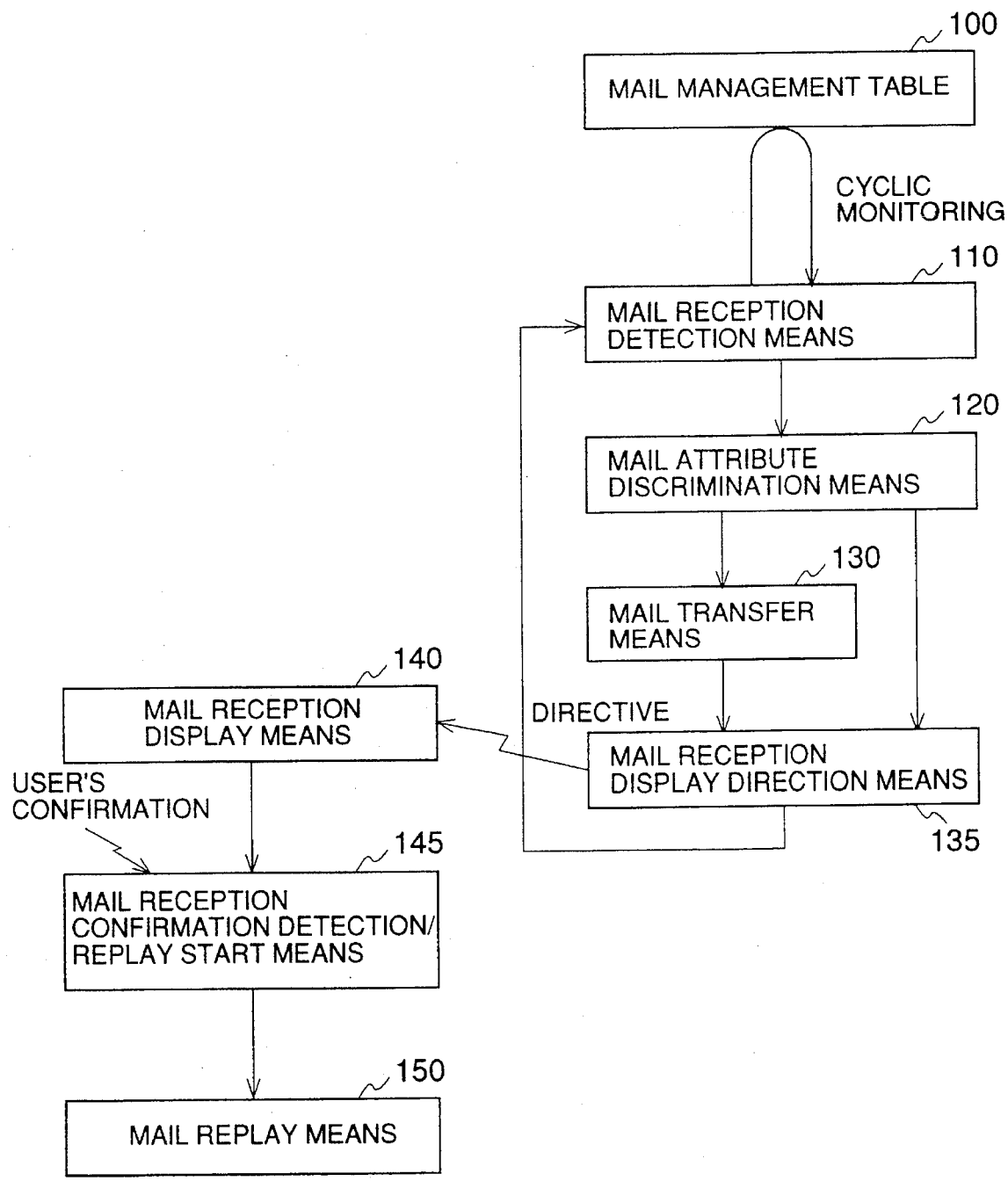
FIG. 1 is a block diagram of software which realizes a mail reception/replay control in an embodiment of the present invention.
Figure 2:
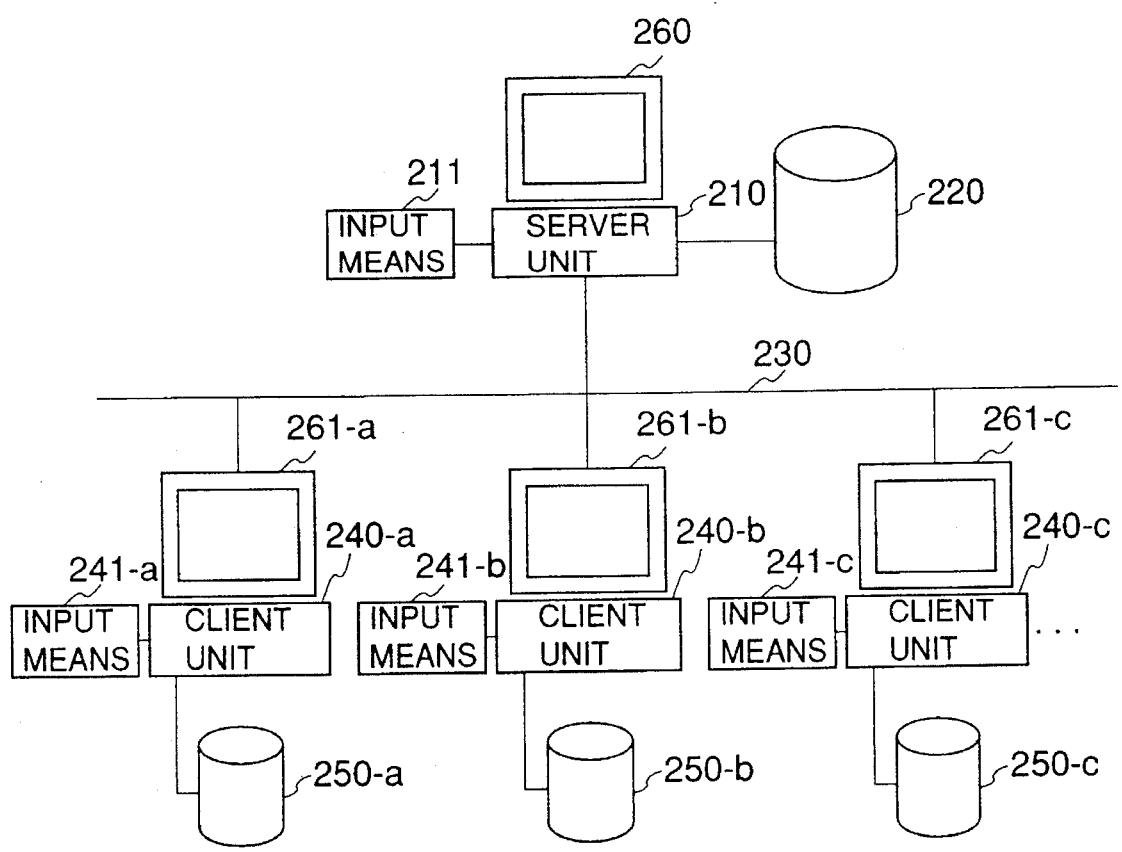
FIG. 2 is an architectural diagram of a client/server system which transmits and receives items of mail in the embodiment of the present invention.

FIG. 2 illustrates the architecture of a client/server system for mail transmission and reception to which the present invention is applied. Referring to FIG. 2, the client/server system comprises a server unit 210 (constituting a server) and a plurality of client units 240-a, 240-b, 240-c, . . . (constituting clients or client terminals), which are respectively connected to the server unit 210 through a communication line 230. In addition, the server unit 210 has a storage unit for the server, 220 connected thereto. This storage unit 220 for the server stores therein items of mail which have been sent from the client terminals, and items of shared information which are individually accessed by the client terminals. The shared information can contain a mail management table (100 in FIGS. 1 and 3) for managing items of mail information, such as mail destinations (addressees), which have been sent from the client terminals. The area size of the server storage unit 220 for storing the items of mail is divided into areas for the respective client terminals beforehand. Further, the respective client units 240-a, 240-b, 240-c, . . . have particular storage units for the clients, 250-a, 250-b, 250-c, . . . connected thereto. The mail stored in the server storage unit 220, the shared information in the server storage unit 220 as accessed by the corresponding client terminal, etc. are transferred to each of the client storage units 250-a, 250-b, 250-c, . . . , and are stored therein. The server unit 210 and the client units 240-a, 240-b, 240-c, . . . can be furnished with input means such as a keyboard or a mouse, 211 and 241-a, 241-b, 241-c, for accepting mail transmission instructions, etc., and display means such as display units, 260 and 261-a, 261-b, 261-c, . . . for displaying the contents of the mail, etc., respectively. Incidentally, the transmission and reception among the server unit 210 and the client units 240-a, 240-b, 240-c, . . . through the communication line 230 can be effected by constructing a LAN (Local Area Network), for example, Ethernet and performing a communication control.

FIG. 3 illustrates the format of the mail management table 100. Such mail management tables 100 are existent in one-to-one correspondence with the respective client terminals, and are stored in the storage unit 220 for the server. In other words, each client terminal corresponds to one mail management table 100. Alternatively, only one mail management table 100 may well be provided by registering the identification information items of the respective client terminals. The constituent information items of the mail management table 100 are written by the record means of the corresponding one of the client units 240-a, 240-b, 240-c, . . . Alternatively, the contents of the constituent information items sent from all of the client units 240-a, 240-b, 240-c, . . . may well be written by the server unit 210.

The illustrated mail management table 100, as seen in FIG. 3 consists of the constituent information items as stated below.

When the client terminal corresponding to the mail management table 100 registers an item of mail, that memory area of the mail management table 100 which is used for registering information items on the item of mail needs to be distinguished from the memory area thereof for information items on any other item of mail. To this end, "Area No." denoted at numeral 300 is prepared, and it contains numbers which are successively allocated to the individual areas in mail-item units. In the column "Area No." 300, area No. n corresponding to the total number of areas in the mail management table 100 is set in accordance with the memory capacity of the divided area allotted to each client within the storage unit 220 for the server.

"Situation of registration/replay" denoted at numeral 310 is a flag which indicates if the mail information items have been registered in the mail management table 100 anew, or if an item of mail registered has been replayed (displayed). In registering the new item of mail, the client terminal on a mail transmission (source or addresser) side detects the memory area in which the column "Situation of registration/replay" 310 contains an expression "Replayed" indicating that the corresponding item of mail has already been loaded, within the mail management table 100 of the client terminal on a mail reception (destination or addressee) side. Subsequently, the transmission side client terminal registers an expression "Under registration" indicating that the mail information items are in the course of being registered, in the column "Situation of registration/replay" 310, and it registers the mail information items in the corresponding area. After the registration, the transmission side client terminal creates the new item of mail and stores the created mail in the storage unit 220 for the server. Finally, it registers an expression "New" indicating that the new item of mail has been registered anew, in the column "Situation of registration/replay" 310. On the other hand, the reception side client terminal monitors the mail management table 100 regularly or cyclically. Upon detecting the expression "New" in the column "Situation of registration/replay" 310, it decides the reception of the new item of mail, and alters the information of the column "Situation of registration/replay" 310 from the expression "New" to an expression "Not replayed" indicating that the new item of mail has not been loaded yet though the reception thereof has been detected. Sooner or later, the reception side client terminal loads the received item of mail stored in the corresponding area of the server storage unit 220 and replays the received mail. After the end of the replay, it alters the information of the column "Situation of registration/replay" 310 to the expression "Replayed".

When the client terminal on the mail transmission side stores the created item of mail in the storage unit 220 for the server, the created mail needs to be distinguished from any other item of mail. To this end, "Mail name" denoted at numeral 320 is prepared so as to register mail file names therein. Each mail file name to be registered in the column "Mail name" 320 is so given that the mail transmission source is associated with the area No. (in the column 300) of the area in which the mail file name is registered, lest the mail file names sent from two or more of the client terminals should agree.

"Mail attribute" denoted at numeral 330 indicates predetermined information on the property of a mail item, such as the property that the item of mail registered by the client terminal on the mail transmission side is urgent or strictly confidential. Besides, when the item of mail needs to be transferred from the server storage unit 220 to the client storage unit without being replayed, information to that effect is registered in the column "Mail attribute" 330. More specifically, "Transfer required" is specified for an item of mail having a large information content, for example, animation information. In this case, the item of mail is merely transferred and is not displayed and replayed simultaneously with the transfer. Thus, the replay of the animation mail is freed from that influence of the traffic state of communication line which might arise when transferring the mail from the storage means of the server and then replaying it. By way of example, when the data between the server and the client is transferred in the form of a packet, the transfer of the animation information gives rise to a situation where the other clients have difficulty with their transfers on account of excessive communication line traffic. Herein, the situation can be relieved in such a way that the animation information is transferred from the storage means of the server to that of the client beforehand when the communication line traffic is comparatively low. Meanwhile, the attribute "Urgent" specifies to display the item of mail at the time of loading thereof. Thus, the mail can be displayed directly and immediately without accepting a reply of confirmation of the mail reception as the user's instruction. In this case, when the attribute "Urgent" has been detected, mail transfer means (130 in FIG. 1) may well be directed to load the mail addressed to each client terminal and stored in the server storage unit 220, while mail replay means (150 in FIG. 1) may well be directed to display the loaded mail.

Next, a mail reception/replay control which is performed in each of the client terminals will be explained with reference to FIG. 1. This figure is a block diagram of software for realizing the mail reception/replay control in this embodiment. The processing steps of the software for realizing the mail reception/replay control are installed in the storage unit (e.g., 250-a) of each client terminal, and the corresponding client unit (e.g., 240-a) executes control processing in conformity with the processing steps. The software for the mail reception/replay control is broadly classified into two sorts of software; software for a reception control, and software for a replay control.

The reception controlling software consists of the following blocks:

Mail reception detection means 110 as the first block functions to detect the reception of an item of mail addressed to this particular client terminal. This means 110 cyclically monitors the mail management table 100 stored in that specified area of the server storage unit 220 which is allotted to each client terminal, and it decides the reception of the mail by detecting the new registration of the mail in the mail management table 100. Whether or not the mail has been registered anew, can be decided in such a way that the server unit 210 sets the flag "New" in the column "Situation of registration/replay" 310 of the mail management table 100 at the time of the new registration, while the mail reception detection means 110 checks the flag "New". When the flag "New" is set, the mail reception detection means 110 determines the new registration and changes the flag "New" to the flag "Not replayed" so as to replay the new item of mail. It is alternatively allowed that the mail reception detection means 110 loads the mail names registered in the mail management table 100 stored in the specified area and holds them beforehand, whereupon it loads the mail names registered in the mail management table 100 stored in the specified area and compares them with the held mail names so as to check the agreement/disagreement thereof, in the monitoring operation. Subsequently, the control processing shifts to mail attribute discrimination means 120.

The mail attribute discrimination means 120 as the second block discriminates the mail attribute of the new mail as registered in the column 330 of the mail management table 100, when the processing has shifted thereto from the mail reception detection means 110. Next, the control processing shifts to the mail transfer means 130 referred to before or to mail reception display direction means 135 in accordance with the discriminated content of the mail attribute. More specifically, when the mail needs to be transferred from the server storage unit 220 to the storage unit (e.g., 250-a) for a particular client, the control processing shifts to the mail transfer means 130, and when the mail transfer is not needed, the control processing shifts to the mail reception display direction means 135. In the latter case where the mail transfer is not needed, the mail is transferred in response to a replay start and is simultaneously displayed (this aspect of operation will be explained later).

The mail transfer means 130 as the third block transfers the corresponding mail information items from the server storage unit 220 to the storage unit for each particular client when the control processing has shifted thereto from the mail attribute discrimination means 120 having determined the necessity of the mail transfer from the server storage unit 220 to the storage unit for each client. Thereafter, the control processing shifts to the mail reception display direction means 135 upon the completion of the mail transfer.

The mail reception display direction means 135 as the fourth block directs mail reception display means 140 (which belongs to the replay controlling software) to display the fact of the mail reception and the information items relevant to the received mail on the display unit (e.g., 261-a), when the control processing has shifted thereto from the mail attribute discrimination means 120 having decided that the mail need not be transferred from the server storage unit 220 to the storage unit for each client, or when the control processing has shifted thereto from the mail transfer means 130. Thereafter, the control processing shifts to the mail reception detection means 110.

Meanwhile, the replay controlling software consists of the following blocks:

The mail reception display means 140 as the first block displays the fact of the mail reception and the information items (for example, the file name and the attribute) relevant to the received mail on the display unit under the direction of the reception controlling software. Thereafter, the control processing shifts to mail reception confirmation detection/ replay start means 145.

The mail reception confirmation detection/replay start means 145 as the second block determines whether or not the user at a particular client terminal has made a reply of confirmation to the display of the mail reception (as the user's instruction). The control processing does not shift to the next block before the user's confirmation is detected. Whether or not the user has confirmed the display of the mail reception, is determined depending upon whether or not the user's instruction has been accepted by the input means (e.g., 241-a). When the mail reception confirmation detection/replay start means 145 has detected the user's confirmation, it actuates the aforecited mail replay means 150 to start the replay. Then, the control processing shifts to the mail replay means 150, which replays the received mail.

The mail replay means 150 as the third block replays the corresponding mail stored in the client storage unit (e.g., 250-a), on the display unit (e.g., 261-a) when the control processing has shifted thereto from the mail reception confirmation detection/replay start means 145 having detected the user's reply of confirmation to the display of the mail reception. Besides, when the mail has not been transferred by the mail transfer means 130, it is loaded of the server storage unit 220 and simultaneously replayed on the display unit.

Now, the detailed flows of the processing of mail transmission/reception in this embodiment will be explained with reference to FIGS. 4 and 5.

Figure 4:
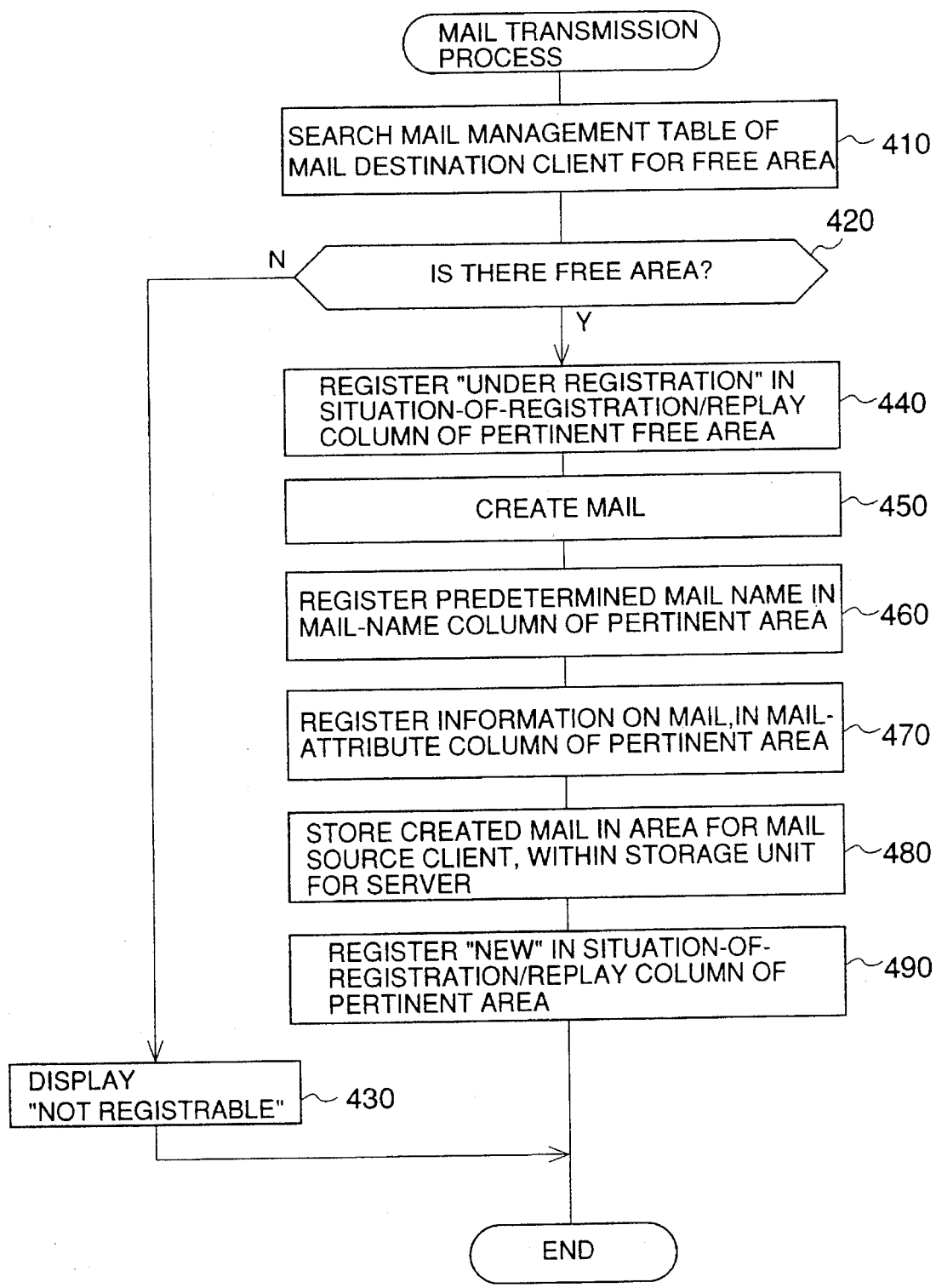
FIG. 4 is a flow chart of a mail transmission process in which a certain client terminal transmits the item of mail to another client terminal in the client/server system depicted in FIG. 2.

FIG. 4 illustrates the processing flow when a certain one of the client terminals transmits an item of mail to another (a mail transmission process).

Referring to FIG. 4, in transmitting the item of mail to the mail reception (destination or addressee) side client terminal, the mail transmission (source or addresser) side client terminal searches the mail management table 100, which corresponds to the mail destination side client terminal and which is stored in the storage unit 220 for the server, for a free area in which the information items of the mail, such as the mail attribute 330, can be recorded or registered (step 410). In the search operation, the recordable area in the mail management table 100 is determined from the expression "Replayed" in the column "Situation of registration/replay" 310 (step 420). In the absence of any recordable area where all the items of the column "Situation of registration/replay" 310 in the mail management table 100 are "Not replayed", a content for notifying the user of the fact that the information items are not registrable is displayed on the display means (e.g., 261-a) (step 430). Then, the mail transmission process is ended. In the presence of the recordable area in the mail management table 100 as the result of the search operation, the transmission side client terminal registers the expression "Under registration" in the column "Situation of registration/replay" 310 of the corresponding area within the mail management table 100 (step 440), thereby preventing any other client terminal from using the corresponding area. Subsequently, the transmission side client terminal cremates the item of mail which is to be transmitted to the opposite client terminal (step 450). Further, it registers a mail file name in which the transmission source and the area No. (in the column 300) of the corresponding area are associated, in the column "Mail name" 320 of the corresponding area within the mail management table 100 (step 460), to thereby prevent the mail file name from agreeing with a mail file name which is registered by any other client terminal. Alternatively, it is allowed to give any desired mail file name and to affix the area No. (in the column 300) thereto at the stage of registering the mail file name in the column "Mail name" 320. At the next step, the mail transmission side client terminal registers the information concerning the mail entered by the user, for example, "Urgent" or "Ordinary" in the column "Mail attribute" 330 of the corresponding area within the mail management table 100 (step 470). On this occasion, when the created mail is one which is affected by the traffic state of communication line, for example, where it is one (such as animation mail) which needs to be replayed in real time, the mail transmission side client terminal registers the attribute "Transfer required" simultaneously in order to request the mail reception side client terminal to transfer the created mail from the server storage unit 220 to the storage unit of the reception side client terminal. Thereafter, the transmission side client terminal stores the created mail in the area allotted thereto within the server storage unit 220 (step 480), and it registers the expression "New" in the column "Situation of registration/replay" 310 of the corresponding area within the mail management table 100 (step 490). Then, the mail transmission process is ended. When the mail attribute is "Urgent" the attribute "Transfer required" is simultaneously registered.

In this manner, when the client terminal on the mail transmission side has detected the free area of the mail management table 100 of the client terminal on the mail reception side, it creates the item of mail while inhibiting the use of the corresponding area by any other client terminal, and it registers the information items relevant to the mail in the corresponding area.

Figure 5:
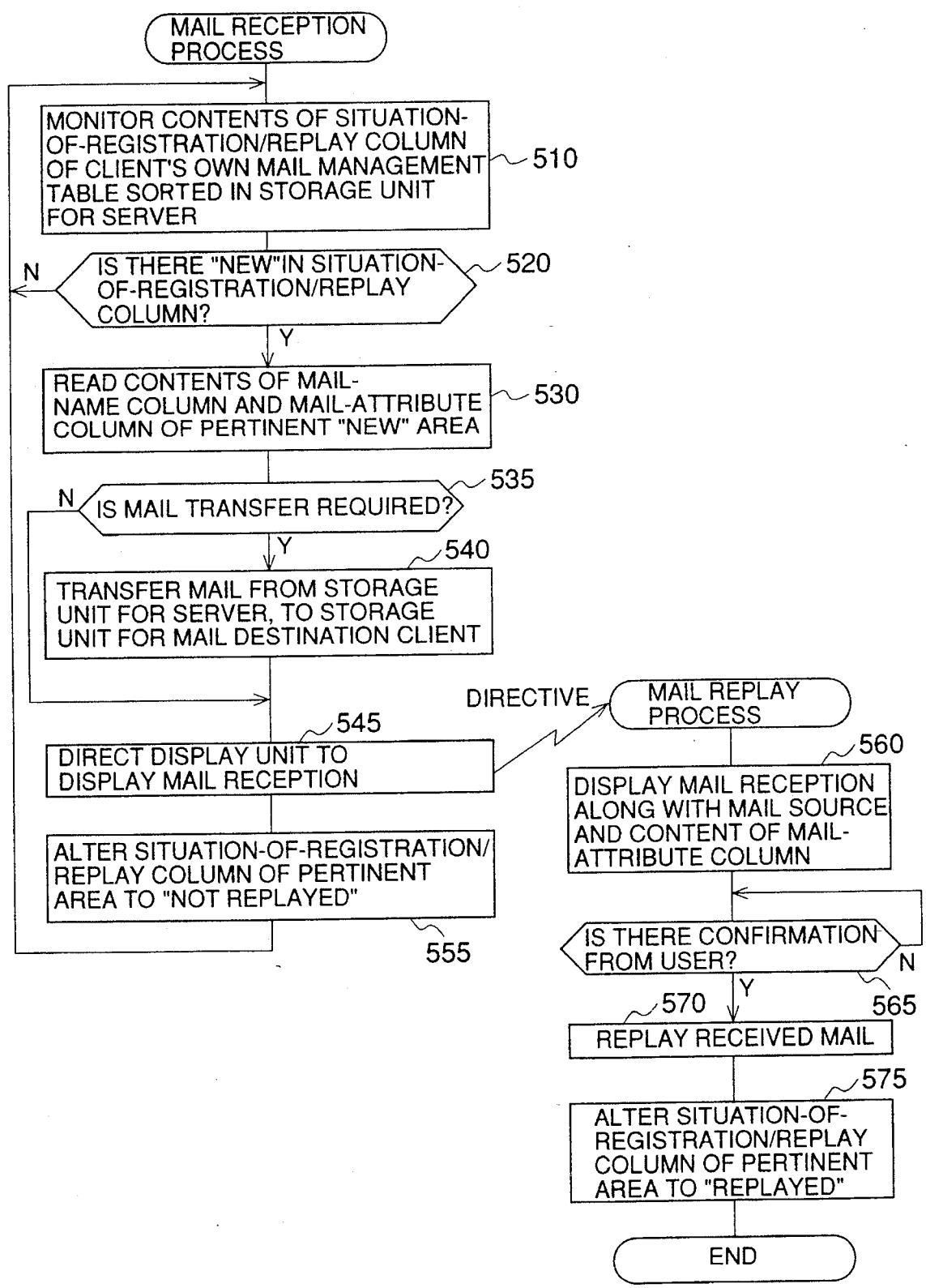

FIG. 5 illustrates the processing flow of the detection of mail reception (mail reception process) and the replay of received mail (mail replay process) in each of the client terminals. The flow shown in FIG. 5 indicates the foregoing flow shown in FIG. 1, in more detail.

At each client terminal, the contents of the column "Situation of registration/replay" 310 of the mail management table 100, which corresponds to that particular client terminal and which is stored in the storage unit 220 for the server, are monitored regularly or cyclically (step 510). Each client terminal determines whether or not there is the expression "New" in the column "Situation of registration/replay" 310, on the basis of the result of the monitoring (step 520). In the absence of the expression "New" each client terminal monitors the contents of the column "Situation of registration/replay" 310 of the mail management table 100 again (step 510). On the other hand, in the presence of the expression "New" in the column "Situation of registration/replay" 310 as the result of the monitoring, that particular client terminal reads the contents of the column "Mail name" 320 and the column "Mail attribute" 330 of the corresponding new mail within the mail management table 100 (step 530). Subsequently, that client terminal decides whether or not the transfer of the mail is required, from the content of the mail attribute 330 read (step 535). Only when the mail transfer is required, does that particular client terminal transfer the corresponding mail from the server storage unit 220 to its own storage unit (step 540). After the mail has been transferred, or when the mail transfer is not required, the client terminal directs the mail reception display means 140 (the display unit (e.g., 261-a) thereof) to present a display to the effect that the mail has been received (step 545). Subsequently, the client terminal alters the expression "New" to the expression "Not replayed" in the column "Situation of registration/replay" 310 (step 555), and it seeks the new mail registration again (step 510).

Meanwhile, the mail replay process having received the directive of the mail reception display from the mail reception process discriminates the transmission source of the mail and the information on the property (such as "Urgent" or "Strictly confidential") of the mail from the contents of the column "Mail name" 320 and the column "Mail attribute" 330. Then, the particular client terminal on the reception side displays the discriminated contents within a pop-up window for displaying the mail reception, thereby notifying the user of the mail reception (step 560). Subsequently, that client terminal checks whether or not there is the user's reply of confirmation to the display of the fact of the mail reception presented on the display unit, in other words, the interrupt of the user's instruction which is given in such a way that the user presses a confirmation button within the pop-up window displaying the mail reception (step 565). In the absence of the interrupt of the user's instruction as the result of the check, that client terminal iteratively checks whether or not there is the interrupt of the user's instruction. On the other hand, in the presence of the interrupt of the user's instruction as the result of the check, the client terminal loads the received mail corresponding to the mail file name of the column " Mail name" 320, from the server storage unit 220, or from the client storage unit (e.g., 250-b) subject to the registration of the attribute "Transfer required" in the column "Mail attribute" 330, whereupon it displays the content of the received mail on the display unit (e.g., 261-b) (step 570). For the attribute "Urgent" the received mail is directly loaded of the server storage unit 220 and then displayed on the display unit without the check of the step 565, in other words, without accepting the reply of confirmation as the user's instruction. When the content of the received mail has been displayed, that client terminal alters the expression "Not replayed" to the expression "Replayed" in the column "Situation of registration/replay" 310 of the corresponding area within the mail management table 100 (step 575). Then, the mail replay process is ended.

As described above, each client terminal normally monitors the situation of the mail reception from any other client terminal and the interrupt of the user's instruction based on the reply of confirmation to the display of the mail reception. When the mail reception has been detected, the pop-up window for displaying to that effect is opened on the display image of the display unit. In addition, when the user has pressed the confirmation button within the pop-up window displaying the fact of the mail reception, through the input means (e.g., 241-b), the client terminal having accepted the user's instruction replays the mail corresponding to the mail reception displayed by the pop-up window.

In this manner, according to this embodiment, the mail reception can be detected on the basis of the mail management table, the fact of the mail reception can be displayed in the pop-up window on the display unit, and the content of the received mail can be seen by pressing the confirmation button indicated within the pop-up window. Further, since a plurality of pop-up windows for displaying the mail reception can be opened on the display image of the display unit, each client terminal can display a plurality of items of mail which are ready for replay operations. Moreover, the user at each client terminal can glance at mail information concerning the items of mail ready for the replay operations, in such a way that he/she brings out the mail information on the display unit while shifting the display positions of the individual pop-up windows. Since an application for the mail reception/replay merely executes the display of the mail reception and the replay of the mail on the display unit, it can be, per se, be kept resident in the minimized window state by displaying the mail reception and replaying the mail within the pop-up window.

Even when the user is engaged in any other job, he/she does not overlook or forget the reception of an item of urgent mail. In addition, he/she can ascertain the content of the received mail without changing-over applications.

According to this embodiment, when an item of mail has been received, notice of the mail reception is displayed on the display unit, along with the attribute (such as "urgent" or "strictly confidential") of the received mail. Therefore, whether or not the received mail is urgent can be determined at the time of reception. Thus, the user can immediately respond also to the urgent mail. Moreover, since the user can see the content of the received mail by making the reply of confirmation to the mail reception display presented on the display unit, he/she can readily ascertain the content of the mail even when performing any other job without the necessity of expressly changing-over applications. Further, in accordance with the content of affixed information sent by the client on the mail transmission side, the client on the mail reception side transfers the mail from the storage unit of the server to its own storage unit in advance before it notifies the user of the mail reception, and it loads the mail of its own storage unit and then replays the loaded mail when it is requested to replay the mail by the user. Thus, even an item of mail susceptible to the traffic state of communication line in the mail replay operation, such as animation mail, can be normally replayed irrespective of the traffic state of communication line. It is therefore possible to prevent the content of the mail from being erroneously communicated.

The present invention brings forth the effect that, when an item of mail has been received, the content of the received mail can be ascertained with ease.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A client/server system, comprising:

a server which includes storage means for storing information therein; and a plurality of clients each of which includes transfer means for registering the information in said storage means of said server, and for loading the information from said storage means, each of said plurality of clients including:

reception detection means for monitoring if the information addressed to each client has been received by said server, input means for accepting an instruction to display said information addressed to each client, said instruction being provided by a user of each client, display means for displaying an output indicative of the reception of said information addressed to each client, when said reception of said information addressed to each client has been detected by said reception detection means, and for displaying said information addressed to each client, when said input means has received said instructions, wherein said input means further accepts a confirmation reply of said reception as the user's instruction when said reception of said information addressed to each client has been displayed by said display means, and replay control means for directing said display means to display said information addressed to each client, when said reply of confirmation of said reception as said user's instruction has been accepted by said input means, wherein said server includes a management table which manages said information stored in said storage means, each of said plurality of clients further includes record means for writing situation information and identification information into said management table, the situation information indicating a selected one of an expression "New" which signifies that said information is to be registered in said storage means and, and an expression "Replayed" which signifies that said information registered anew has been loaded from said storage means by said transfer means, the identification information identifying the addressee client of said information to be transmitted, and being written when said information is to be registered in said storage means by said transfer means, said reception detection means refers to said management table in order to monitor if said information addressed to each client bas been received by said server, and detects said reception of said information addressed to each client when said expression "New" is borne as said situation information, said transfer means loads said information addressed to each client and bearing said expression "New" as said situation information, from said storage means, said record means rewrites said situation information of the loaded information to said expression "Replayed" after said information has been loaded by said transfer means, said management table further manages any attribute which concerns said information stored in said storage means, said record means further writes said attribute when said information is to be transmitted to said server by said translet means, said reception detection means further detects said attribute written in said management table, said display means displays said attribute as still another output, along with said display output which indicates said reception of said information addressed to each client, said attribute specifies for the loading of the stored information by said transfer means, either of the timing at which said confirmation reply of said reception as said user's instruction has been accepted by said input means and an alternative timing before accepting said user's instruction, at which said reception of said information addressed to said each client has been detected by said reception detection means, and said reception detection means directs said transfer means to load said stored information at the timing specified by said attribute, when it has detected said attribute written in said management table.

2. A client/server system as defined in claim 1, wherein said server includes a management table which manages said information stored in said storage means, each of said plurality of clients further includes record means for writing situation information and identification information into said management table, the situation information indicating a selected one of an expression "New" which signifies that said information is to be registered in said storage means anew, an expression "Replayed" which signifies that said information registered anew has been loaded from said storage means by said transfer means, and an expression "Not replayed" which signifies that said reception of the new registered information by said server has been detected by said reception detection means, and that said new registered information is not yet loaded from said storage means by said transfer means, the identification information identifying the addressee client of said information to-be-transmitted, and being written when said information is to be registered in said storage means by said transfer means, said reception detection means refers to said management table in order to monitor if said information addressed to said each client has been received by said server, and detects said reception of said information addressed to said each client when said expression "New" is borne as said situation information, said record means rewrites said situation information of the received information to said expression "Not replayed" when said reception has been detected by said reception detection means, said transfer means loads said received information bearing said expression "Not replayed" as said situation information, from said storage means, said record means rewrites said situation information of the loaded information to said expression "Replayed" after said information has been loaded by said transfer means, said management table further manages any attribute which concerns said information stored in said storage means, said record means further writes said attribute when said information is to be transmitted to said server by said transfer means, said reception detection means further detects said attribute written in said management table, said display means displays said attribute as still another output, along with said display output which indicates said reception of said information addressed to each client, said attribute specifies for the loading of the stored information by said transfer means, either of the timing at which said confirmation reply of said reception as said user's instruction has been accepted by said input means and an alternative timing before accepting said user's instruction, at which said reception of said information addressed to said each client has been detected by said reception detection means, and said reception detection means directs said transfer means to load said stored information at the timing specified by said attribute, when it has detected said attribute written in said management table.

3. A client/server system, comprising:

a server which includes storage means for storing information therein; and a plurality of clients each of which includes transfer means for registering the information in said storage means of said server, and for loading the information from said storage means, each of said plurality of clients including:

reception detection means for monitoring if the information addressed to each client has been received by said server, input means for accepting an instruction to display said information addressed to each client, said instruction being provided by a user of each client, display means for displaying an output indicative of the reception of said information addressed to each client, when said reception of said information addressed to each client has been detected by said reception detection means, and for displaying said information addressed to each client, when said input means has received said instructions, wherein said input means further accepts a confirmation reply of said reception as the user's instruction when said reception of said information addressed to each client has been displayed by said display means, and replay control means for directing said display means to display said information addressed to each client, when said reply of confirmation of said reception as said user's instruction has been accepted by said input means, wherein said server includes a management table which manages said information stored in said storage means, each of said plurality of clients further includes record means for writing situation information and identification information into said management table, the situation information indicating a selected one of an expression "New" which signifies the said information is to be registered in said storage means anew, and an expression "Replayed" which signifies that said information registered anew has been loaded from said storage means by said transfer means, the identification information identifying the addressee client of said information to-be-transmitted, and being written when said information is to be registered in said storage means by said transfer means, said reception detection means refers to said management table in order to monitor if said information addressed to each clients has been received by said server, and detects said reception of said information addressed to each client when said expression "New" is borne as said situation information, said transfer means loads said information addressed to each client and bearing said expression "New" as said situation information, from said storage means, said record means rewrites said situation information of the loaded information to said expression "Replayed" after said information has been loaded by said transfer means, said management table further manages any attribute which concerns said information stored in said storage means, said record means further writes said attribute when said information is to be transmitted to said server by said transfer means, said reception detection means further detects said attribute written in said management table, said display means displays said attribute as still another output, along with said display output which indicates said reception of said information addressed to each client, said attribute specifies either of an operation of presenting the display of said information addressed to each client, when said reply of confirmation of said reception as said user's instruction has been accepted by said input means, and an operation of presenting said display when said information has been loaded by said transfer means, alternatively without accepting said user's instruction, and said reception detection means directs said transfer means to load said information addressed to each client as stored in said storage means and also directs said display means to display said information addressed to each client, based on a condition that said attribute written in said management table as detected by said reception detection means specifies said operation of presenting said display when said information has been loaded by said transfer means.

4. A client/server system, comprising:

a server which includes storage means for storing information therein; and a plurality of clients each of which includes transfer means for registering the information in said storage means of said server, and for loading the information from said storage means, each of said plurality of clients including:

reception detection means for monitoring if the information addressed to each client has been received by said server, input means for accepting an instruction to display said information addressed to each client, said instruction being provided by user of each client, display means for displaying an output indicative of the reception of said information addressed to each client, when said reception of said information addressed to each client has been detected by said reception detection means, and for displaying said information addressed to each clients, when said input means has received said instructions, wherein said input means further accepts a confirmation reply of said reception as the user's instruction when said reception of said information addressed to each client has been displayed by said display means, and replay control means for directing said display means to display said information addressed to each client, when said reply of confirmation of said reception as said user's instruction has been accepted by, said input means, wherein said server includes a management table which manages said information stored in said storage means, each of said plurality of clients further includes record means for writing situation information and identification information into said management table, the situation information indicating a selected one of an expression "New" which signifies that said information is to be registered in said storage means anew, an expression "Replayed" which signifies that said information registered anew has been loaded from said storage means by said transfer means, and an expression "Not replayed" which signifies that said reception of the new registered information by said server has been detected by said reception detection means, and that said new registered information is not yet loaded from said storage means by said transfer means, the identification information identifying the addressee client of said information to-be-transmitted, and being written when said information is to be registered in said storage means by said transfer means, said reception detection means refers to said management table in order to monitor if said information addressed to said each client has been received by said server, and detects said reception of said information addressed to said each client when said expression "New" is borne as said situation information, said record means rewrites said situation information of the received information to said expression "Not replayed" when said reception has been detected by said reception detection means, said transfer means loads said received information bearing said expression "Not replayed" as said situation information, from said storage means, said record means rewrites said situation information of the load information to said expression "Replayed" after said information has been loaded by said transfer means, said management table further manages any attribute which concerns said information stored in said storage means, said record means further writes said attribute when said information is to be transmitted to said server by said transfer said reception detection means further detects said attribute written in said management table, said display means displays said attribute as still another output, along with said display output which indicates said reception of said information addressed to each client, said attribute specifies either of an operation of presenting the display of said information addressed to each client, when said confirmation reply of said reception as said user's instruction has been accepted by said input means, and an operation of presenting said display when said information has been loaded by said transfer means, alternatively without accepting said user's instruction, and said reception detection means directs said transfer means to load said information addressed to each client as stored in said storage means and also directs said display means to display said information addressed to each client, based on a condition that said attribute written in said management table as detected by said reception detection means specifies said operation of presenting said display when said information has been loaded by said transfer means.

5. An information reception/display control method in a mail system having a plurality of terminals which transmit and receive information, and storage means for storing therein the information sent from each of the terminals, said method comprising the steps of:

monitoring if the information addressed to each terminal has been stored in said storage means;

producing a display output which indicates that said information addressed to each terminal has been received by said storage means, when the storage of said information in said storage means has been detected;

accepting a confirmation reply of the reception from a user at said each terminal when said display output has been produced;

loading said information addressed to each terminal, from said storage means when said reply of confirmation of said reception has been accepted; and displaying the loaded information addressed to said each terminal, as an output, wherein when the information is to be transmitted from each terminal to said storage means, an attribute which specifies an operation of loading said information at the detection of said reception of said information is affixed to said information, and based on a condition that said attribute is affixed when said storage of said information addressed to said each terminal in said storage means has been detected, said information addressed to said each terminal is loaded from said storage means upon said detection, instead of upon the acceptance of said confirmation reply of said reception.

6. An information reception/display control method in a mail system having a plurality of terminals which transmit and receive information, and storage means for storing therein the information sent from each of the terminals; comprising the steps of:

allowing said each terminal to transmit the information to said storage means, and to affix an attribute to said information, said attribute specifying either of an operation of displaying said information when said information has been loaded from said storage means, and an operation of displaying said information when a reply of confirmation of the reception of said information has been accepted from a user at the each terminal;

monitoring if said information addressed to said each terminal has been stored in said storage means;

discriminating said attribute, and loading said information addressed to said each terminal, from said storage means, when the storage of said information in said storage means has been detected;

producing a display output which indicates said reception of said information addressed to said each terminal, when said reception of said information has been detected;

displaying said information addressed to said each terminal, as an output at the loading of said information from said storage means, on condition that the discriminated attribute specifies said operation of displaying said information when said information has been loaded from said storage means; and displaying said information addressed to said each terminal, as an output upon the acceptance of said reply of confirmation of said reception from said user, on condition that said discriminated attribute specifies said operation of displaying said information when said reply of confirmation of said reception has been accepted from said user.

* * * * *